Patented Mar. 30, 1937

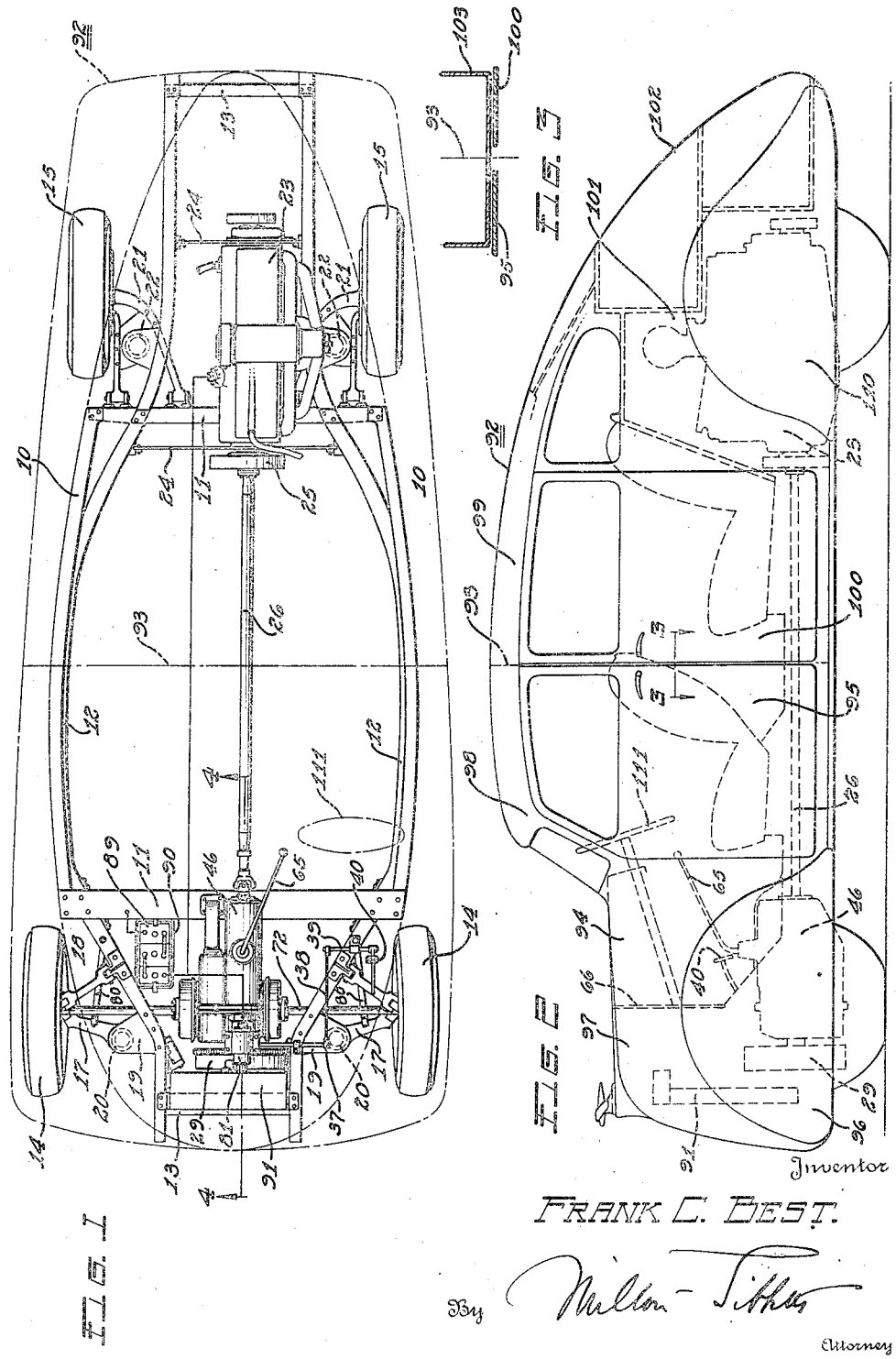

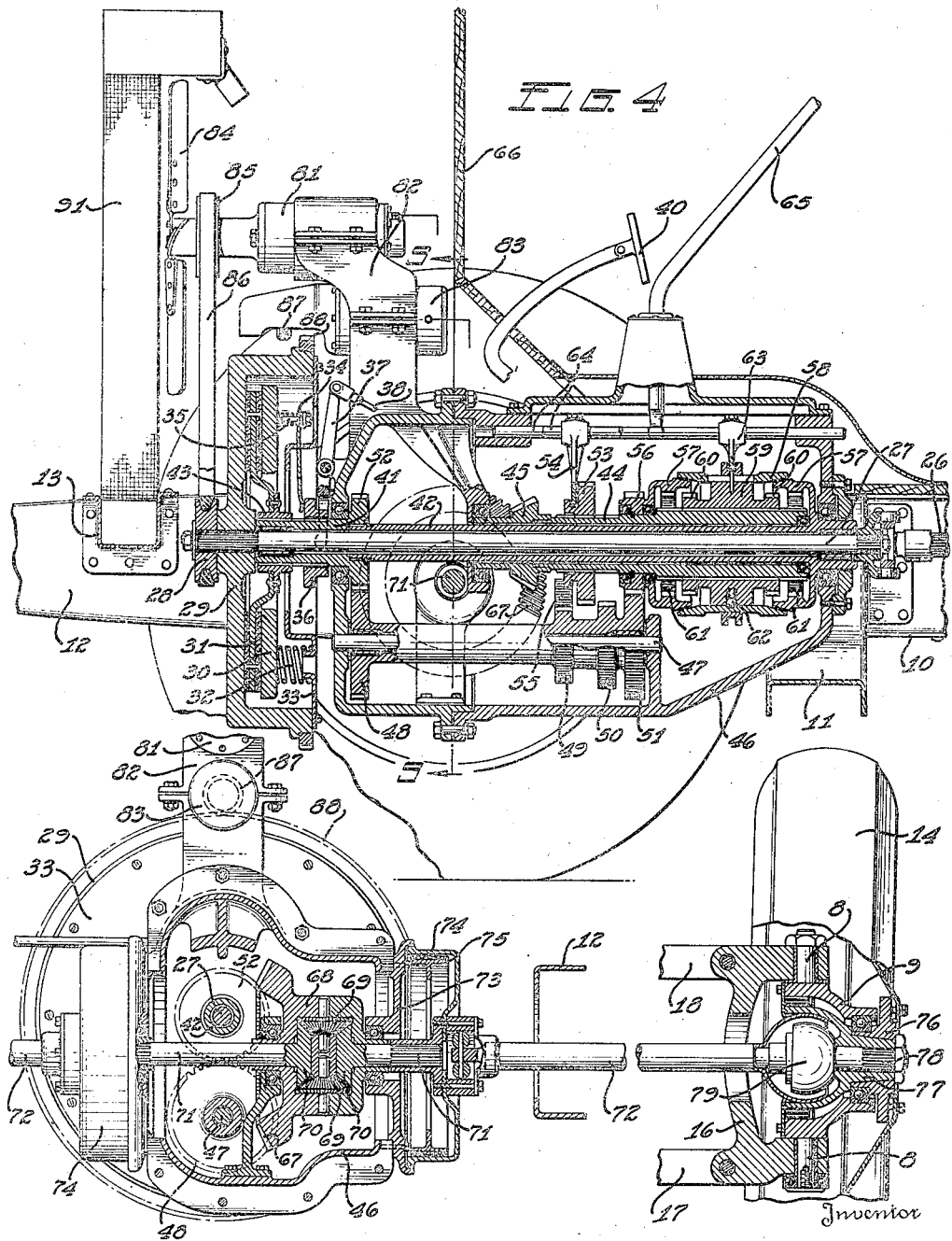

2,075,084

UNITED STATES PATENT OFFICE 2,075,084

MOTOR VEHICLE

Frank C. Best, Detroit, Mich., assignor to Packard Motor Car Company, Detroit, Mich., a corporation of Michigan Application April 20, 1934, Serial No. 721,428

14 Claims. (Cl. 180—54)

This invention relates to motor driven road vehicles and more particularly to road vehicles in which the front steering wheels are driven by a rearwardly located engine.

Vehicles having front steering wheels driven by an engine located at the rear provide better performance, more safety and increased riding comfort as compared with vehicles having the rear wheels driven by an engine located at the front. With the latter vehicle, the weight of the body at the rear balances the weight of the motor at the front but the commercial development of the front drive rear engine vehicle has been retarded because no practical way has been devised to counterbalance the body and engine weight when they are both rearwardly disposed. Of course with a rear engine vehicle, the seating arrangement has been shifted forward and the change speed mechanism has been arranged in the forward portion of the drive but, with such arrangements, the center of gravity of the vehicle is still behind the point required for proper balance longitudinally.

It is an object of this invention to provide a novel form of drive mechanism for vehicles having the front wheels driven by a rearwardly located engine which will permit a proper longitudinal vehicle balance.

Another object of the invention is to provide for the longitudinal balance of a vehicle, having a rear engine driving the front steering wheels, by the employment of body panels formed of material of such a character that the weight thereof at the front is greater than that at the rear.

A further object of the invention is to provide a novel form of drive mechanism for vehicles which will allow the use of a body in which the passengers can be seated a short distance behind the steering wheels in order that their weight may assist in properly balancing the vehicle longitudinally.

Still another object of the invention resides in a new and novel form of drive mechanism wherein the clutch and a flywheel are located on the side of the change speed gearing remote from the source of power.

Another object of the invention is to provide for longitudinally balancing a vehicle, having the front steering wheels driven from an engine located at the rear, by arranging the clutch and flywheel portion of the drive mechanism in advance of a line extending through the axes of the steering wheels.

Other objects of the invention will appear from the following description taken in connection with the drawings, which form a part of this specification, and in which:

Fig. 1 is a plan view of a motor vehicle, having the body outlined diagrammatically, in which my invention is incorporated;

Fig. 2 is a side elevational view of the vehicle;

Fig. 3 is a sectional view of the body taken on line 3—3 of Fig. 2;

Fig. 4 is a sectional view illustrating the forward end of the drive mechanism taken on line 4—4 of Fig. 1;

Fig. 5 is a sectional view taken on line 5—5 of Fig. 4 showing the front axle drive mechanism.

Referring now to the drawings by characters of reference, the frame or load supporting means consists of side sills 10 joined transversely at their front and rear ends by cross members 11, and another pair of side sills 12 are secured to the sills 10 and project beyond the cross members 11 where they are joined by cross members 13. The end portions of the side sills 12 extending beyond the cross members 11 are closer together than the intermediate portions between the cross members 11.

The frame is carried by a pair of front steering and driving wheels 14 and a pair of rear wheels 15 which are located exteriorly of the frame. The front wheels are mounted on a knuckle member 16 and vertically spaced links 17 and 18 are pivotally connected at one end to each knuckle member and at their other ends to the adjacent portion of the frame. Brackets 19 project transversely from the frame in a plane above the links 17 and coil springs 20 are carried between such brackets and links 17. The rear wheels are rotatably mounted on links 21 and brackets are provided between such links and the frame in order to retain coil springs 22.

Carried on the rear portion of the frame is a conventional form of internal combustion engine 23 which is supported by a pair of longitudinally spaced bracket supporting means 24. Drive means extends from the engine to the front steering wheels 14. On the front end of the engine crankshaft is fixed a relatively small light weight flywheel 25 to which is connected a forwardly extending articulated propeller shaft consisting of sections 26 and 27, such propeller shaft having its front end in close proximity to the forward end of the frame well in advance of a line defined by the axes of the front wheels. Fixed on the front end of the shaft section 27 is a pulley 28 and fixed on the shaft immediately behind the pulley is a relatively heavy flywheel 29, the flywheel being disposed forwardly of a line defined by the axes of the steering wheels.

The drive means between the front flywheel and the steering wheels includes a clutch and change speed transmission mechanism both of which are arranged rearwardly of the flywheel. The clutch is of conventional design and includes a pressure plate 30 arranged within the flywheel which is normally urged into position to clamp the clutch plate structure 31 against the flywheel 29 by coil springs 32, such springs being seated against a clutch backing plate 33 fixed to the rear end of the flywheel. A plurality of levers 34 extend through openings in a flanged portion of the rear cover plate and engage at their outer ends stud means 35 projecting from the pressure plate and are engaged at their inner ends by a clutch collar 36. Forward movement of the collar through means of a yoke on lever 37, which is operated by a rod 38 fixed on a shaft 39 and manually operable by the pedal 40, causes the outer ends of the levers to rock rearwardly and move the pressure plate therewith to release the friction plate structure 30 from the flywheel to thus disengage the clutch. Release of the pressure against the pedal 40 allows the springs 32 to move the pressure plate forwardly and thereby automatically establish a driving connection between the flywheel 29 and a driving shaft composed of keyed together sections 41 and 42, the plate structure having a hub portion 43 splined to the shaft section 41. The driving shaft telescopes the front section of the propeller shaft and suitable bearing means are interposed therebetween. Rotatably mounted on the rear portion of the driving shaft, and telescopically associated therewith, is a driven shaft 44 to the forward end of which is fixed gear 45. The telescoping driving propeller shafts extend lengthwise through a transmission casing 46 and are suitably mounted in the end walls thereof, and the driven shaft is located within the rear portion of the casing.

A lay shaft 47 is mounted in the casing in parallel relation with the telescoping shafts and a sleeve carrying gears 48, 49, 50, and 51 is rotatably mounted thereon. The gear 48 is in constant mesh with a gear 52 which is formed on the rear end of the driving shaft section 41 and arranged within the casing. Gear 53 is splined on the driven shaft and is shiftable axially thereon by means of a yoke 54, such gear being adapted to be selectively engaged with gear 50 or with a reverse gear 55 in the casing which is in mesh with the gear 49. A gear 56 is rotatably mounted on the driven shaft and is arranged in mesh with gear 51 on the lay shaft. The gear 56 and the rear end of the end portion of the driving shaft are formed with axially extending flanged peripheries 57 with which an axially shiftable friction ring member 58 can be engaged. Within the ring member is a clutch hub 59 which is splined to the driven shaft and axially movable thereon, such hub having gear teeth 60 formed externally on each end thereof for engagement with gear teeth 61 formed internally of the flanges 57, the gear teeth 60 being adapted to engage the internal teeth 61 to provide a positive drive when in engagement. The ring 58 and the hub are associated to move together by a spring pressed ball 62 when the shifter element 63 is moved longitudinally of the vehicle but this ball connection is such that after the friction clutch means on the collar has engaged either of the flanges 57 and brought it to the same speed, then the ball is shifted out of locking relation by pressure of continued operation of the shifter member 63 and the hub can be moved so that the exterior teeth at one end will be moved into engagement with the internal teeth at the adjacent flange, thereby establishing a positive driving relation therebetween and without a clashing of such engaging teeth.

The shifter yokes 54 and 63 are operated by rails 64 which are controlled by the usual shift lever 65. It will be seen that the propeller shaft extends through the transmission casing to an extreme forward point on the vehicle and that the flywheel is located at the forward end of the propeller shaft and has associated therewith the clutch which, when engaged, will rotate the driving shaft extending longitudinally through the transmission case in telescopic relation with the propeller shaft. When the hub 59 is positively engaged with the flanged rear end of the driving shaft 42, a direct drive will be imparted through the hub to the driven shaft and the gear 45, it being understood that under such circumstances there is no driving connection between the internal gear formed on the flange of the gear 56 and the hub and that the gear 53 is not in contact with either the reverse gear 55 or the gear 50. When a reverse drive is desired, the hub 59 is in neutral position, and the gear 53 is shifted to mesh with the gear 55 and thus the drive takes place through the gears 52, 48, 49, 55, and 53 to rotate the driven shaft and the gear 45. Low speed is obtained through gears 52, 48 and 50 when the gear 53 is shifted into mesh with the gear 50 and with the hub 59 in neutral position. Second speed is obtained, when the gear 53 is in neutral position, through means of gears 52, 48, 51, and 56 when the hub 59 is shifted forwardly so that the forward external teeth mesh with the internal teeth on the flange 57 extending from the gear 56, the drive being transmitted from the hub to the driven shaft and the gear 45 due to the splined relation between the hub and the driven shaft.

This arrangement of drive mechanism, with the flywheel at such an extreme forward position, allows the transmission to be placed well forward so that it is located partially in advance of a line defined by the axes of front steering wheels and thus the weight of such structure assists in balancing the weight of the engine so that the center of gravity will be sufficiently forward to obtain a desired longitudinal vehicle balance. As the flywheel is so near the front of the vehicle, it in no way restricts the space occupied by the body and, as a result, the body dash 66 can be arranged above a line defined by the front wheel axes. Consequently, the seating arrangement for the occupants of the vehicle body can be placed further forward than has heretofore been possible with the result that the weight of the occupants is better utilized to assist in the location of the center of gravity of the vehicle at a desired forward point.

Meshing with the drive pinion 45 is a ring gear 67 which, in the present instance, is formed integral with a differential housing 68 carrying pinions 69 meshing with pinions 70 on the inner ends of driving axles consisting of articulated sections 71 and 72. Cover plates 73 enclose openings in the sides of the transmission casing and provide supports for the axle sections 71 which extend therethrough. The joints between the axle sections 71 and 72 are of a conventional type which will permit vertical and lateral movement of the axle sections 72 with respect to the sections 71. Fixed to the axle sections 71 are brake drums 74 and within such drums are brake bands 75 which are operated in the conventional manner.

In order that the front axles may be of the same length, the differential housing is offset from the longitudinal center line of the car. The front wheels are fixed to hubs comprising sections 76 and 77, the hub sections 77 being keyed on outer sections 78 of the articulated drive shafts. Between the sections 72 and 78 of the drive shafts are universal joints, as indicated at 79, which permit steering or lateral movement of the wheel and the parts to which it is fixed. The front wheel hubs telescope carriers 9 and suitable bearings are provided therebetween, the carriers having journals 8 on which the knuckles 16 are mounted. Conventional steering mechanism 111 can be associated with the front wheels, and radius rods 80 are interposed between the links 17 and a portion of the frame at the rear thereof.

This arrangement of the driving shaft, the flywheel and the clutch permit the placement of driven engine accessories at the forward end of the vehicle so that the weight thereof can be utilized to counterbalance the engine weight without interrupting the necessary drives when the clutch is disengaged and without the necessity of bringing an individual drive for the accessories forwardly from the engine. The generator 81 is carried by a bracket structure 82 secured to the transmission housing and this same bracket structure carries the engine starter 83. The generator shaft extends forwardly and carries a fan 84 at the front end thereof and a pulley 85 which is aligned with the pulley 28, a suitable belt 86 encircling the pulleys just mentioned in order to drive both the fan and the generator. Associated with the starter is the usual gear 87 which is shifted into engagement with the gear 88 on the flywheel and suitable connections extend from the generator and the starter to a battery 89 which can also be arranged at the forward end of the vehicle and carried by a suitable mounting 90. In advance of the fan 84 is arranged the radiator 91 having suitable connections leading to the engine for the circulation of water or a cooling fluid. It is obvious that the arrangement of such engine accessories at such a forward point on the frame assists in moving the center of gravity of the vehicle forwardly to a point where proper longitudinal balance, sufficient for practical purposes, can be had.

As a means of further assisting in the forward location of the center of gravity of the vehicle, I propose to provide a body structure which is wide at the forward end in order to accommodate three passengers in the front seat and to utilize panels of different weight, the heavier paneling being at the forward part of the body and the lighter paneling being at the rear part of the body. I prefer to obtain this difference in panel weight by utilizing two different materials, for example, aluminum for the rear paneling and steel for the paneling at the front end, such paneling being of substantially the same thickness. The body is indicated generally at 92 and, in the present instance, the heavier paneling extends forwardly of a vertical line through the body, substantially as indicated at 93. The hood 94, the front door panels 95, the front fenders 96, the front bonnet 97 and the roof paneling 98 are formed of steel and the roof panels 99, the rear door panels 100, the rear body panels 101, the rear fenders 110 and rear compartment cover 102 are formed of aluminum. The frame work of the body and a door post 103 being shown in Fig. 3 can be formed of suitable strong material. The longitudinal point dividing the type of paneling used can be located as may be desired to place the longitudinal center of gravity as required.

The transmission case protrudes above the flooring of the body, but only to a limited extent, and the width of the same is such that it will not interfere with the foot room for the occupants of the front seat. The toe board is immediately at the rear of the dash and, as the dash is located above a line defined by the axes of the steering wheels, the front seat can be located as far forward of the vehicle as such leg room will permit. The front seats can thus be further to the front than is the case when the flywheel is at the rear of the transmission case because, in such event, the portion of the flywheel projecting into the body would interfere and likewise, by placing the flywheel at the forward end of the vehicle as described, the driven engine accessories will not become disconnected from the propeller shaft upon release of the clutch.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A motor road vehicle comprising a frame, a pair of front steering and drive wheels connected with the frame, a pair of rear wheels connected with the frame, a motor supported by the rear end of the frame, a flywheel in advance of a line defined by the axes of the front pair of wheels, drive means connecting the motor with the flywheel, power transmission means connected in driving relation with the front wheels and in the same general longitudinal plane therewith, and clutch means between the flywheel and the transmission means, the position of said flywheel relative to the motor assisting in the longitudinal balance of the vehicle.

2. A motor road vehicle comprising a frame, front and rear pairs of wheels supporting the frame, a motor at one end of the frame, power transmission means adjacent and connected with the pair of wheels at the frame end remote from the motor, drive means extending from the motor to a point projecting beyond the power transmission means, and a clutch between the projecting portion of the drive means and the transmission means, the position of said clutch means relative to said motor assisting in the longitudinal balance of the vehicle.

3. A motor road vehicle comprising a frame, front and rear pairs of wheels supporting the frame, an engine at one end of the frame, an accessory at the other end of the frame from the engine, a live shaft extending from the engine to a point adjacent the accessory, a driving connection between the live shaft and the accessory, power transmission means including change speed gearing located between the accessory and the engine, said transmission being connectible to drive the pair of wheels at the accessory end of the frame, and clutch means between the live shaft and the transmission means.

4. A motor road vehicle comprising a frame, front and rear pairs of wheels supporting the frame, a body on the frame having panels formed of two metals of different weight, a power plant at one end of the frame, and means connecting the power plant in driving relation with the pair of wheels at the opposite end of the frame therefrom, said metal panels at the end of the body adjacent the power plant being lighter than those at the other end to balance the vehicle longitudinally.

5. In a motor vehicle, a frame, a motor adjacent one end of the frame, and sheet metal enclosure means, said sheet metal being of different weight longitudinally of the vehicle with the heavier portion arranged to counterbalance the weight of the motor.

6. In a motor vehicle, a frame, a motor supported by one end of the frame, and sheet metal enclosure means on the frame formed of aluminum and steel, the aluminum portion of the enclosure being arranged longitudinally adjacent the motor with the portion therebeyond being of steel to counterbalance the weight of the motor.

7. A motor road vehicle comprising a frame having a pair of supporting wheels at the front and rear, an engine mounted on the rear portion of the frame, a shaft extending forwardly from the engine beyond the axes of the front wheels, driving means connecting the shaft with the front wheels, an engine accessory shaft adjacent the forward end of said shaft, and a positive driving connection between said shafts in advance of the front wheel axes.

8. A motor road vehicle comprising a frame having front and rear supporting wheels, an engine on one end of the frame, a flywheel at the opposite end of the frame from the engine, a drive shaft connecting the engine with the flywheel, transmission mechanism between the flywheel and the engine for driving the wheels at the opposite end of the frame from the engine, and clutch means connecting the flywheel with the transmission mechanism, the position of said fly-wheel relative to said engine assisting in the longitudinal balance of the vehicle.

9. In a motor road vehicle having a frame with an engine at one end and driven wheels at the other end, driving means connecting the engine with the wheels comprising three mutually telescoping shafts, a flywheel, said flywheel and the engine being connected to opposite ends of one shaft, clutch means between the flywheel and a second shaft, means connecting the second and third shafts, and change speed driving connections between the third shaft and the wheels.

10. In a motor road vehicle having an engine adjacent one end and a pair of traction wheels adjacent the other end, drive means comprising telescoping shafts, one of which is connected at one end to the engine and the other of which is connected through a change speed transmission to drive the pair of wheels, a flywheel fixed to said first shaft at the end remote from the engine, and clutch means connecting the flywheel with said second shaft, the position of said flywheel relative to said engine serving to assist in the longitudinal balance of the vehicle.

11. In a motor road vehicle having an engine and a pair of wheels, drive means comprising a first shaft connected at one end to the engine, a flywheel on the other end of said shaft, a second shaft telescopically associated with said first shaft, clutch means connecting the second shaft with the flywheel, a third shaft telescopically associated with the other shafts, a drive connection between the third shaft and the wheels, and means for connecting the second and third shafts in driving relation at different speed ratios.

12. In a motor road vehicle having an engine and a pair of wheels, drive means comprising a first shaft connected at one end to the engine, a flywheel on the other end of said shaft, a second shaft telescopically associated with said first shaft, clutch means connecting the second shaft with the flywheel, a third shaft telescopically associated with the other shafts, a drive connection between the third shaft and the wheels, and means for connecting the second and third shafts in driving relation at different speed ratios, said clutch and said means for connecting the second and third shafts being intermediate the flywheel and the engine.

13. In a motor vehicle having an engine and a pair of wheels, drive means between the engine and wheels comprising a first shaft connected at one end to the engine, a flywheel fixed on the other end of the shaft, a second shaft telescopically associated with the first shaft, a clutch on the second shaft engageable with the flywheel, a third shaft telescopically associated with the other shafts and connectible to drive the wheels, and a connector hub between the second and third shafts, said hub being telescopically associated with said third shaft and slidably splined thereto.

14. In a motor road vehicle having a frame with a power plant at the rear end and driven wheels at the forward end, drive means between the power plant and the wheels comprising a pair of telescoping shafts, a clutch mechanism between the forward ends of said shafts, a third shaft telescoping the first mentioned shafts, change speed mechanism connecting the two outermost shafts, and a driving connection between said wheels and said change speed mechanism.

FRANK C. BEST.